UNITED STATES PATENT OFFICE.

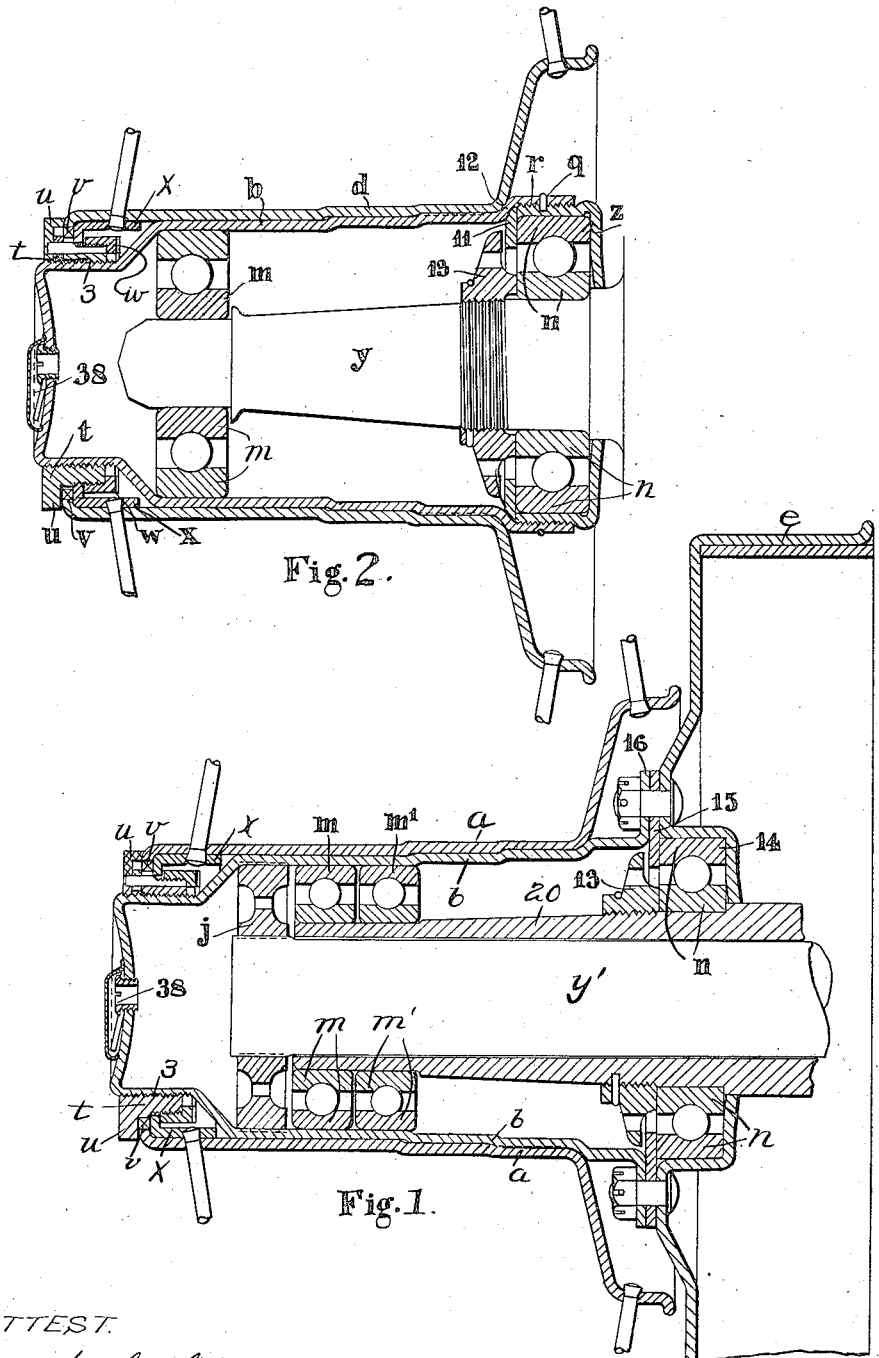

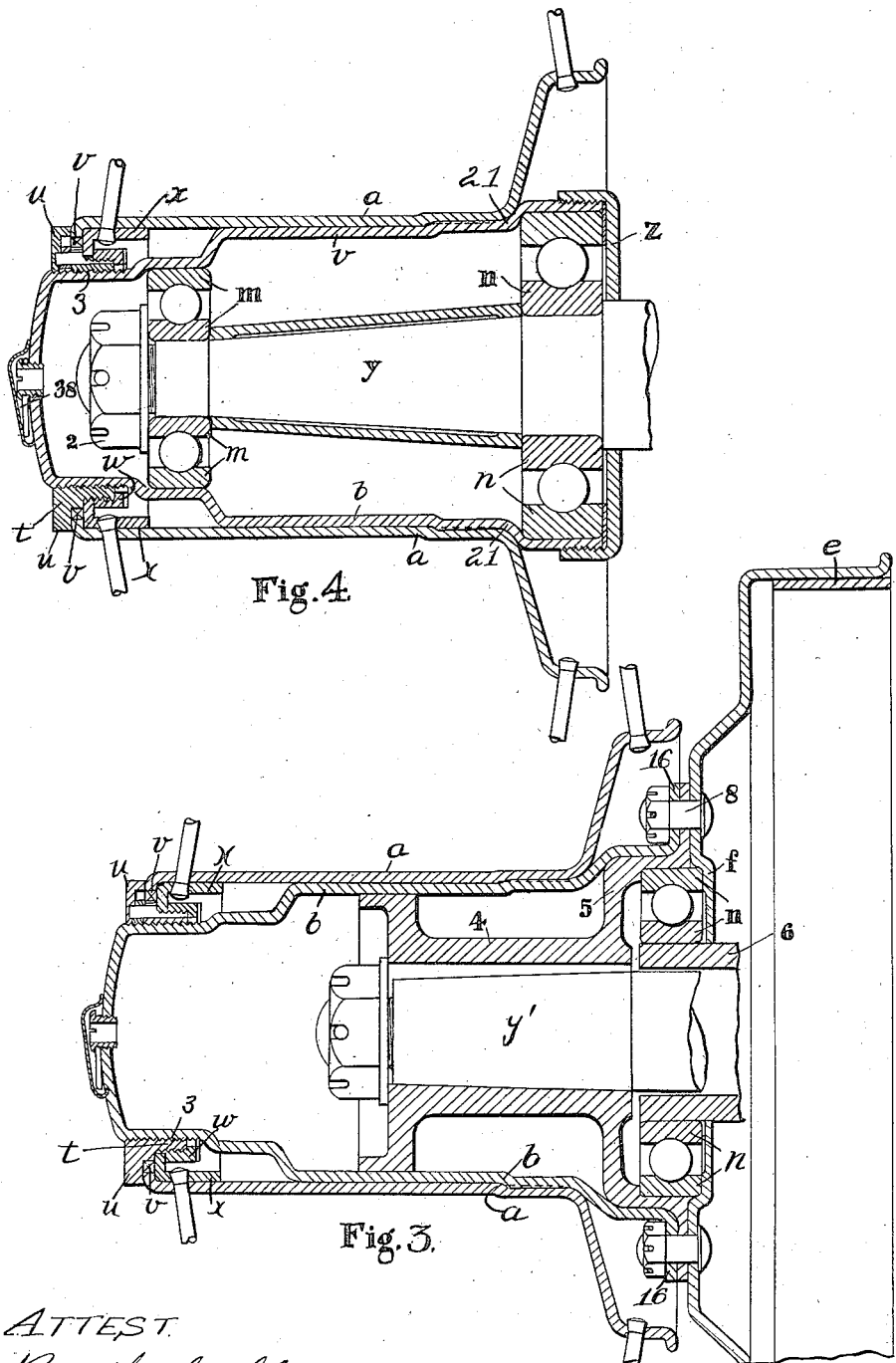

JOHN V. PUGH, OF ALLESLEY, ENGLAND.

DETACHABLE-WHEEL HUB.

1,129,725.

Specification of Letters Patent. Patented Feb. 23, 1915.

Application filed March 6, 1909. Serial No. 481,634.

*To all whom it may concern:*

Be it known that I, JOHN VERNON PUGH, a subject of the King of Great Britain and Ireland, and residing at Guiting House, Allesley, in the county of Warwick, England, have invented certain new and useful Improvements in Detachable-Wheel Hubs, of which the following is a specification.

This invention relates to improvements in detachable wheels for motor and other vehicles.

The object of this invention is to provide an improved construction of permanent hub part for use with a detachable part, which permanent hub part may be readily taken apart and withdrawn to give access to the lock nut or the like which secures the permanent hub part in position on the axle or axle sleeve and to disclose the internal bearings when such are used.

The invention consists in forming the inner permanent hub part in a plurality of pieces which may be secured together, the division being so taken that each of the pieces may be readily stamped out of thin metal, and also so as to give easy access to the nut or the like which secures the hub in position in the axle or axle sleeve and to the internal bearings.

The invention also consists in arranging the ball bearings or other axially restricted rotational bearing means which will hereinafter be called ball bearings, by which an inner permanent hub part as set out above is mounted on its axle or axle sleeve in such a manner that while the permanent hub part can be easily drawn off said axle or axle sleeve whether it has an open or closed end, at least one of the ball races in contact with said permanent hub part or other rotating part is rigidly connected thereto.

The invention also consists in the improved construction of detachable wheels and details thereof as hereinafter indicated.

Referring now to the accompanying drawings:—Figure 1 is a sectional view of a detachable driving wheel with a divided permanent hub part and having a ring locking device. Figs. 2, 3 and 4 are sectional views of modified forms of detachable driving and non-driving wheels.

In carrying this invention into effect in the form shown in Fig. 1 as applied to a back or driving wheel, the live axle $y'$ carries at its end a driving star $j$, or perforated disk. In close proximity to this driving disk ball bearings, $m$ and $m'$ are provided, the outer races of each being held securely in the rotating inner permanent shell, $b$ while the inner races are relatively loosely mounted upon an axle sleeve, 20. The brake drum $e$, which is preferably of stamped metal is formed with a recess 14, in which the races of the inner ball bearing, $n$, are secured, one race being retained in this recess by means of a washer 15, inserted between the disk of the brake drum and a flange 16, on the permanent hub shell, and the other race by means of a flanged ring 13, screwed upon the axle sleeve 20 which flanged ring retains the permanent hub $b$, in position. One ball bearing may be used in the outer part, if desired, but two are preferably used there in order to avoid the increased diameter of the outer shell that would be necessary if a single bearing were used; the outer bearing or bearings float and take no end thrust; all the thrust being taken by the inner bearing.

In a modification of the invention (shown in Fig. 2) as applied to a front wheel one of the races of the ball bearing, $m$, near the outside of the wheel is fixed firmly within the shell of the permanent hub part $b$, while the other race is mounted loosely over the end of the stub axle $y$. Another ball bearing $n$, at the inner side of the wheel is secured firmly within the cap, $z$, which may be screwed into the end of the shell of the permanent hub part $b$, and locked thereto by a spring ring $q$, or other suitable means, a washer 11, being interposed between the ring and a buttress 12, on the shell to prevent any side displacement of the ball race. The permanent hub part is then held in position upon the stub axle by means of a flange ring 13, bearing against one race of the ball bearing, $n$, as shown. All side thrusts are taken by the inner ball bearing. In removing the permanent hub part the permanent shell $b$, and the cap $z$, are unscrewed from one another which allows the permanent shell to be removed from the axle with the ball bearing, $m$, firmly fixed within it, the other ball bearing $n$, being retained in the cap, $z$.

In both the constructions shown in Figs. 1 and 2, the permanent hub part is held in position upon the axle, $y$, or axle sleeve 20, by the screw-threaded ring 13, which engages with one race of the inner ball bearing $n$. By this means the space between the inner and outer bearings is utilized and a material shortening of the length of the hub is obtainable since the holding ring or nut need not be placed at the outer end of the axle or axle sleeve.

In another construction of a back wheel the live axle *y'* (Fig. 3) is keyed to a sleeve, 4, which is secured to the inner permanent hub part *b* upon which the detachable hub part *a*, is sleeved and to which the driving power is transmitted through any suitable engaging means. The sleeve 4, is provided with a flange 5, and an end recess in which is placed a ball bearing *n*, the races of which are mounted between the flange 5, and a fixed sleeve 6. The races are held in position by means of the side flange *f*, of the brake drum *e*, which is held against the sleeve flange 5, by means of bolts 8, passing through both and through a flange 16 on the permanent hub part *b*.

All these forms of wheels are peculiarly well adapted for construction from stamped thin metal and they may be arranged to provide an oil bath so that the bearings are continually lubricated.

An important feature of the construction is that in both the back and front hubs the races of the bearings have been arranged to be forced very tightly into the parts of the hubs that they fit while they may be comparatively loose on the stationary or non-rotating parts.

Although I have referred herein to front wheels and back driving wheels, it must be understood that the invention is applicable in cases where the front wheel takes the drive. If the wheels are applied to chain driven cars, the chain wheel may be clamped to the brake drum or otherwise carried by the inner hub part. As whenever a driving or braking element is used that element is attached only to the inner permanent hub part the same outer detachable hub part may be used either for a wheel which is or for a wheel which is not to transmit driving or braking forces and in changing the detachable part of a driving or braking wheel none of the braking or driving gear is interfered with so that the change may be effected with great rapidity.

In the construction of a front wheel shown in Fig. 4 I provide two ball bearings *m* and *n* one at each end of the stub axle, *y*, and between the races on the axle I place a distance piece 22. The permanent hub part is formed of a shell *b*, and a cap *z*, this cap holding one of the races of the ball bearing *n* on the inner side of the hub against the shoulder 21, while the outer race of the bearing *m* in this case is not rigidly fixed in the inner hub shell *b*. A nut, 2, on the end of the stub axle *y*, holds the permanent hub in position.

Having now described my invention what I claim as new and desire to secure by Letters Patent is:—

1. A detachable wheel hub comprising in combination an inner permanent hub shell, a cap removably attached to the inner end thereof, bearing means fastened by said cap to said shell, axle means to which said bearing means are attached, and means outwardly of said attached bearing means forming a slidable supporting connection between said hub shell and said axle means disengageable upon removal of said cap.

2. A detachable wheel hub comprising in combination an inner permanent hub shell, a cap removably attached to the inner end thereof, bearing means fastened by said cap to said shell, a non-rotatable axle to which said bearing means are attached, and further bearing means outwardly of said attached bearing means forming a slidable supporting connection between said hub shell and said axle disengageable upon removal of said cap.

3. A detachable wheel hub comprising in combination an inner permanent hub shell, bearing means at the extreme inner end thereof, a cap removably attaching said bearing means to said hub shell, a non-rotatable axle, a nut attaching said bearing means to said axle, and further bearing means gripped in the outer end of said hub shell and having a slidable bearing on said axle end outwardly of said nut, whereby a maximum length between bearings for a given hub length is obtained.

4. A detachable wheel hub comprising in combination an inner permanent hub shell, a cap removably attached to the inner end thereof, and making a faced fluid-tight joint therewith, bearing means fastened by said cap to said shell, a non-rotatable axle to which said bearing means are attached, and further bearing means attached to the outer end of said axle forming a slidable supporting connection between said hub shell and said axle disengageable upon removal of said cap, whereby said hub shell may be formed with a solid end and will more easily retain fluid lubricant.

5. A detachable wheel hub comprising in combination an inner permanent hub shell, a cap removably attached to the inner end thereof, a washer gripped between said hub shell and cap and making a faced fluid-tight joint with each, bearing means fastened in said cap by said washer, a non-rotatable axle, a nut attaching said bearing means to said axle, and further bearing means gripped in the outer end of said hub shell and having a slidable bearing upon said axle end outwardly of said nut and forming a supporting connection between said hub shell and said axle disengageable upon removal of said cap.

6. In combination in a detachable wheel hub a rotatable axle, a non-rotatable axle sleeve, a hub shell, driving means between said axle and said hub shell, a member provided with a cylindrical recess at the extreme inner end of said hub shell, a washer between said hub shell and said member, bolts connecting said three last mentioned parts, one part of an axially restricted rotational bearing means secured in said cylindrical recess by said washer, a corresponding part of said bearing means encircling said sleeve, an abutment on said sleeve, a ring screwing on to said sleeve holding said corresponding bearing part against said abutment, an extension of said sleeve outwardly of said ring, parts of further bearing means rigidly secured within the outer end of said hub shell and corresponding parts of said further bearing means slidably mounted on said sleeve extension and disengageable therefrom upon axial movement of said hub shell in an outward direction.

In testimony whereof, I affix my signature in presence of two witnesses.

JOHN V. PUGH.

Witnesses:
 ALBERT BROWN,
 JOHN RAVEN.